US008678880B2

(12) United States Patent
Ito et al.

(10) Patent No.: US 8,678,880 B2
(45) Date of Patent: Mar. 25, 2014

(54) APPARATUS AND METHOD FOR MEASURING TOOTH SURFACE DEVIATION, APPARATUS AND METHOD FOR FORMING GRINDING TOOL, AND GEAR MESHING METHOD FOR GEAR GRINDING APPARATUS

(75) Inventors: Tatsuya Ito, Dublin, OH (US); Masao Kume, Utsunomiya (JP); Naoki Iwasa, Tochigi-ken (JP); Hiroshi Ogawa, Tochigi-ken (JP); Keisuke Takahashi, Tochigi-ken (JP); Yuichi Tomizawa, Sakura (JP); Yasutaka Matsuo, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 13/499,466

(22) PCT Filed: Sep. 28, 2010

(86) PCT No.: PCT/JP2010/066822
§ 371 (c)(1),
(2), (4) Date: Mar. 30, 2012

(87) PCT Pub. No.: WO2011/043225
PCT Pub. Date: Apr. 14, 2011

(65) Prior Publication Data
US 2012/0190274 A1 Jul. 26, 2012

(30) Foreign Application Priority Data

Oct. 5, 2009  (JP) ................................. 2009-231976
Oct. 5, 2009  (JP) ................................. 2009-231977
Oct. 5, 2009  (JP) ................................. 2009-231980

(51) Int. Cl.
*B23F 23/12* (2006.01)

(52) U.S. Cl.
USPC ..................................... 451/10; 451/5; 451/47

(58) Field of Classification Search
USPC ........................ 451/5, 8, 9, 10, 11, 47; 409/66
See application file for complete search history.

(56) References Cited

U.S. PATENT DOCUMENTS 4,027,245 A * 5/1977 Bourrat et al. ................ 700/163
4,339,895 A * 7/1982 Fivian ............................ 451/47
(Continued)

FOREIGN PATENT DOCUMENTS

JP    07-051936 A    2/1995
JP    09-207067 A    8/1997
(Continued)

*Primary Examiner* — Lee D Wilson
*Assistant Examiner* — Joel Crandall
(74) *Attorney, Agent, or Firm* — Rankin, Hill & Clark LLP

(57) ABSTRACT

A device for measuring tooth surface deviation includes a contact detector that measures the deviation at the tooth surface of a dresser with respect to a grinding tooth surface formed on a helical grinding tooth of a grinding tool when the grinding tool and a dresser toothed wheel are rotated synchronously in a state in which the grinding tooth surface and the dresser tooth surface of the dresser toothed wheel can be brought into contact, and detects contact between the grinding tooth surface and the dresser tooth surface; and a controller that changes the speed of rotation of the dresser toothed wheel in such a way that the detection result of the contact detector comes within the range of contact determination data, and also measures the amount by which the grinding tool and the dresser toothed wheel have been changed in one revolution of the dresser toothed wheel.

10 Claims, 10 Drawing Sheets

(56) References Cited

U.S. PATENT DOCUMENTS

| | | | |
|---|---|---|---|
| 4,755,950 A * | 7/1988 | Rao | 700/164 |
| 4,815,239 A * | 3/1989 | Sommer | 451/5 |
| 4,848,040 A * | 7/1989 | Nishino | 451/5 |
| 4,947,590 A * | 8/1990 | Schapp et al. | 451/47 |
| 4,955,163 A * | 9/1990 | Sommer | 451/47 |
| 6,290,574 B1 * | 9/2001 | Thyssen | 451/9 |
| 2011/0136408 A1 * | 6/2011 | Frazee et al. | 451/8 |
| 2012/0225609 A1 * | 9/2012 | Yanase et al. | 451/11 |

FOREIGN PATENT DOCUMENTS

| | | |
|---|---|---|
| JP | 2000-326141 | 11/2000 |
| JP | 2004-330397 A | 11/2004 |
| JP | 2005-081500 A | 3/2005 |
| JP | 3679184 | 8/2005 |
| JP | 3910427 | 4/2007 |

\* cited by examiner

APPARATUS AND METHOD FOR MEASURING TOOTH SURFACE DEVIATION, APPARATUS AND METHOD FOR FORMING GRINDING TOOL, AND GEAR MESHING METHOD FOR GEAR GRINDING APPARATUS

TECHNICAL FIELD

The present invention relates to an apparatus (device) for and a method of measuring a deviation (run-out) of a tooth surface of a gear from a grinding tooth surface of a grinding tool when the grinding tool and the gear are synchronously rotated while the grinding tooth surface of the grinding tool and the tooth surface of the gear are capable of being held in contact with each other, an apparatus for and a method of forming a grinding tool, and a gear meshing method for a gear grinding apparatus at the time of grinding a gear with the grinding tool.

BACKGROUND ART

Heretofore, there have widely been known a technology for forming a grinding tooth surface of a grinding tool by synchronously rotating the grinding tool and a dresser gear while the grinding tooth surface of the grinding tool and a dresser tooth surface of the dresser gear are being held in contact with each other, and a technology for grinding a tooth surface of a workpiece gear by synchronously rotating a grinding tool and the workpiece gear while a grinding tooth surface of the grinding tool and the tooth surface of the workpiece gear are being held in contact with each other.

In the technical field of the former technology, Japanese Patent No. 3679184 discloses a meshing method for accurately bringing the dresser tooth of the dresser gear and the grinding tooth of the grinding tool before the grinding tooth surface is formed.

Japanese Patent No. 3679184 states that a pulse generator generates pulses corresponding to an angular displacement of a grinding wheel drive motor. Based on a change in pulses output from the pulse generator, contact between a tooth surface of a tooth of a dresser and a grinding wheel is detected with respect to each of normal and reverse directions in which the grinding wheel rotates. The central position where the tooth of the dresser and the grinding wheel mesh with each other is determined from the detected contact.

In the technical field of the latter technology, Japanese Patent No. 3910427 and Japanese Laid-Open Patent Publication No. 2000-326141 disclose meshing methods which are relevant to the above meshing method.

Japanese Patent No. 3910427 states that based on a positional deviation of a workpiece shaft with respect to a command value for the workpiece shaft or a tool shaft, the position where a tooth surface of a tooth of a workpiece and a grinding surface of a grinding tool is detected with respect to each of normal and reverse directions in which the workpiece shaft rotates, and the central position where the tooth of the workpiece and the grinding surface of the grinding tool mesh with each other is determined from the detected position.

Japanese Laid-Open Patent Publication No. 2000-326141 states that contact between a tooth surface of a tooth of a gear to be machined and a side surface of a grinding wheel screw is confirmed by an acoustic emission (AE) ultrasonic sensor, and the central position where the tooth of the gear to be machined and the grinding wheel screw mesh with each other is determined from the detected contact.

SUMMARY OF INVENTION

When a grinding tooth surface of a grinding tool is formed by a dresser tooth surface of a dresser gear, an error occurs due to a shaft displacement caused at the time the dresser gear is installed, diameter variations of an abrasive grain coating electrodeposited on the grinding tooth surface, and the accuracy with which the dresser gear is manufactured. The error appears as a deviation of the dresser tooth surface with respect to the grinding tooth surface when the grinding tooth surface is formed. If the deviation is too large, then the grinding tooth surface and the dresser tooth surface contact each other unstably, tending to result in a reduction in the accuracy with which the grinding tooth surface is formed. The reduction in the formed accuracy of the grinding tooth surface becomes most evident when the grinding tooth surface is formed using all dresser teeth of the dresser gear. One way to minimize the reduction in the formed accuracy of the grinding tooth surface is to use only some of the dresser teeth of the dresser gear. However, using only some of the dresser teeth of the dresser gear is liable to reduce the forming capability of the dresser gear. Similarly, when a tooth surface of a gear is ground by a grinding tooth surface of a grinding tool, the accuracy with which the tooth surface of the gear is ground may be reduced.

One approach to solving the above problems is to measure the deviation referred to above.

If the method disclosed in Japanese Patent No. 3679184 is used to measure the deviation, then since only contact between one tooth of a dresser and a grinding wheel is detected, contact between other teeth, which are different from the one tooth, of the dresser and the grinding wheel is not detected. Consequently, the deviation cannot be detected highly accurately.

If the methods disclosed in Japanese Patent No. 3910427 and Japanese Laid-Open Patent Publication No. 2000-326141 are used to measure the deviation, then the deviation cannot be detected highly accurately for the same reason as the method disclosed in Japanese Patent No. 3679184.

The present invention has been made in view of the above problems. It is an object of the present invention to provide a tooth surface deviation measuring apparatus and a tooth surface deviation measuring method which are capable of highly accurately measuring a deviation of a tooth surface of a gear with respect to a grinding tooth surface of a grinding tool.

Another object of the present invention is to provide a grinding tool forming apparatus and a grinding tool forming method which are capable of increasing the formed accuracy of a grinding tool and also increasing the forming capability of a dresser gear by highly accurately measuring a deviation of a dresser tooth surface of the dresser gear with respect to a grinding tooth surface of the grinding tool.

Still another object of the present invention is to provide a gear meshing method for a gear grinding apparatus which is capable of making the ground accuracy of a tooth surface of a workpiece gear higher than heretofore by highly accurately measuring a deviation of the tooth surface of the workpiece gear with respect to a grinding tooth surface of a grinding tool.

According to a first invention, there is provided a tooth surface deviation measuring apparatus for measuring a deviation of a tooth surface of a gear with respect to a helical grinding tooth surface of a grinding tool when the grinding tool and the gear rotate in synchronism with each other while the grinding tooth surface of the grinding tool and the tooth surface of the gear are capable of being held in contact with each other, comprising contact detecting means for detecting contact between the grinding tooth surface and the tooth surface, rotational speed changing means for changing a rotational speed of either one of the grinding tool and the gear such that the detection result by the contact detecting means falls within a prescribed range, and a measuring device for measuring an amount of phase change of the grinding tool and the gear which are made by the rotational speed changing means, along the entire circumference of the gear.

With the tooth surface deviation measuring apparatus according to the first invention, since the rotational speed changing means changes the rotational speed of either one of the grinding tool and the gear such that the detection result by the contact detecting means falls within a prescribed range, the grinding tooth surface of the grinding tool and the tooth surface of the gear are kept in contact with each other to a prescribed contact degree. Therefore, the amount of phase change of the grinding tool and the gear (the amount of change in the rotational speed) which is caused by the rotational speed changing means corresponds to a deviation of the tooth surface of the gear. Since the measuring device measures amounts of phase change of the grinding tool and the gear along the entire circumference of the gear, the deviation of the tooth surface of the gear with respect to the grinding tooth surface can be measured highly accurately.

If the rotational speed changing means changes the rotational speed of the grinding tool, a complex control process may be required because rotational positions of the gear and accounts of phase change of the grinding tool and the gear need to be associated with each other. On the other hand, if the rotational speed changing means changes the rotational speed of the gear, it is easy to associate rotational positions of the gear and amounts of phase change of the grinding tool and the gear with each other from the rotational amount (rotational position or rotational angle) of the gear. Therefore, the control process is made simpler than if the rotational speed changing means changes the rotational speed of the grinding tool.

In the first invention, the contact detecting means may comprise an AE sensor. The AE sensor is effective to detect contact between the grinding tooth surface and the tooth surface with higher accuracy than if the contact detecting means comprises a vibration sensor, a torque sensor, an accumulated pulse sensor, or the like.

According to a second invention, there is provided a tooth surface deviation measuring method of measuring a deviation of a tooth surface of a gear with respect to a helical grinding tooth surface of a grinding tool when the grinding tool and the gear rotate in synchronism with each other while the grinding tooth surface of the grinding tool and the tooth surface of the gear are capable of being held in contact with each other, comprising the detecting step of detecting contact between the grinding tooth surface and the tooth surface with contact detecting means, the rotational speed changing step of changing a rotational speed of either one of the grinding tool and the gear such that the detection result by the contact detecting means falls within a prescribed range, and the measuring step of measuring an amount of phase change of the grinding tool and the gear which are made in the rotational speed changing step, along the entire circumference of the gear.

With the tooth surface deviation measuring method according to the second embodiment, the rotational speed changing step changes the rotational speed of either one of the grinding tool and the gear such that the detection result by the contact detecting means falls within a prescribed range, and changes that are made in the phase of the grinding tool and the gear are measured along the entire circumference of the gear. Therefore, a deviation of the tooth surface of the gear with respect to the grinding tooth surface of the grinding tool can be measured highly accurately.

According to a third invention, there is provided a grinding tool forming apparatus comprising a dresser gear having dresser tooth surfaces for contacting grinding tooth surfaces of a helical grinding tooth of a grinding tool, the dresser gear being rotatable in synchronism with the grinding tool while the grinding tooth surface and the dresser tooth surfaces are capable of being held in contact with each other, contact detecting means for detecting contact between the grinding tooth surface and the dresser tooth surface, rotational speed changing means for changing a rotational speed of either one of the grinding tool and the dresser gear such that the detection result by the contact detecting means falls within a prescribed range, and recording means for recording an amount of phase change of the grinding tool and the dresser gear along a prescribed range of the dresser gear, wherein the grinding tool and the dresser gear are rotated in synchronism with each other based on information recorded by the recording means.

With the grinding tool forming apparatus according to the third invention, the rotational speed changing means changes the rotational speed of either one of the grinding tool and the dresser gear such that the detection result by the contact detecting means falls within a prescribed range, and thus the grinding tooth surfaces of the grinding tool and the dresser tooth surfaces of the dresser gear are kept in contact with each other to a prescribed contact degree. Therefore, the amount of phase change of the grinding tool and the dresser gear (the amount of change in the rotational speed) which is caused by the rotational speed changing means corresponds to a deviation of the dresser tooth surface. Since the recording means records the amount of phase change of the grinding tool and the dresser gear along a prescribed range of the dresser gear, a deviation of the dresser tooth surface with respect to the grinding tooth surfaces can be measured highly accurately. When the dresser gear and the grinding tool are rotated in synchronism with each other based on the information recorded by the recording means, the effect of a deviation of the dresser tooth surfaces which is caused when the grinding tool is formed can be ignored (reduced). Therefore, the formed accuracy of the grinding tool is increased. Even when the grinding tool is formed using the entire circumference of the dresser gear, the formed accuracy of the grinding tool is prevented from becoming lower. Consequently, the formed accuracy of the grinding tool is increased, and the forming capability of the dresser gear is increased.

In the third invention, the rotational speed changing means may change the rotational speed of the dresser gear. When the rotational speed changing means changes the rotational speed of the dresser gear, it is easy to associate rotational positions of the dresser gear and amounts of phase change of the grinding tool and the dresser gear with each other from the rotational amount (rotational position or rotational angle) of the dresser gear. Therefore, the control process is made simpler than if the rotational speed changing means changes the rotational speed of the grinding tool.

In the third invention, the contact detecting means may comprise an AE sensor. The AE sensor is effective to detect contact between the grinding tooth surfaces and the dresser tooth surfaces with higher accuracy than if the contact detecting means comprises a vibration sensor or a torque sensor, or uses accumulated pulses.

According to a fourth invention, there is provided a grinding tool forming method comprising the synchronous rotating step of rotating a grinding tool and a dresser gear in synchronism with each other while grinding tooth surfaces of a helical grinding tooth of the grinding tool and dresser tooth surfaces of the dresser gear are capable of being held in contact with each other, the detecting step of detecting contact between the grinding tooth surfaces and the dresser tooth surfaces with contact detecting means, the rotational speed changing step of changing a rotational speed of either one of the grinding tool and the dresser gear such that the detection result by the contact detecting means falls within a prescribed range, and the recording step of recording an amount of phase change of the grinding tool and the dresser gear along a prescribed range of the dresser gear, wherein the grinding tool and the dresser gear are rotated in synchronism with each other based on information recorded in the recording step.

With the grinding tool forming method according to the fourth invention, the rotational speed changing step changes the rotational speed of either one of the grinding tool and the dresser gear such that the detection result by the contact detecting means falls within a prescribed range, and changes that are made in the phase between the grinding tool and the dresser gear are recorded along a prescribed range of the dresser gear. Therefore, a deviation of the dresser tooth surfaces with respect to the grinding tooth surfaces can be measured highly accurately. Furthermore, since the dresser gear and the grinding tool are rotated in synchronism with each other based on the information recorded by the recording step, the effect of a deviation of the dresser tooth surfaces which is caused when the grinding tool is formed can be ignored (reduced). Therefore, the formed accuracy of the grinding tool is increased, and the forming capability of the dresser gear is increased.

According to a fifth invention, there is provided a gear meshing method for a gear grinding apparatus, comprising the synchronous rotating step of rotating a grinding tool and a workpiece gear in synchronism with each other while a helical grinding tooth of the grinding tool and a tooth of the workpiece gear are capable of being held in contact with each other, the detecting step of detecting contact between the grinding tooth and the tooth with contact detecting means, the first rotational speed changing step of changing a rotational speed of either one of the grinding tool and the workpiece gear such that the detection result by the contact detecting means falls within a prescribed range, thereby bringing a right tooth surface of the tooth into contact with the grinding tooth, the second rotational speed changing step of changing a rotational speed of either one of the grinding tool and the workpiece gear such that the detection result by the contact detecting means falls within a prescribed range, thereby bringing a left tooth surface of the tooth into contact with the grinding tooth, the recording step of recording an amount of phase change of the grinding tool and the workpiece gear which are made in the first and second rotational speed changing steps along the entire circumference of the workpiece gear, and the calculating step of calculating a central position of the tooth with respect to the grinding tooth when the grinding tooth and the tooth are held in mesh with each other, based on information recorded in the recording step.

With the gear meshing method according to the fifth invention, since the first rotational speed changing step changes the rotational speed of either one of the grinding tool and the workpiece gear such that the detection result by the contact detecting means falls within a prescribed range, the grinding tooth surface of the grinding tool and a right tooth surface of the workpiece gear are kept in contact with each other to a prescribed contact degree. Therefore, the amounts of phase change of the grinding tool and the workpiece gear which are made by the first rotational speed changing step correspond to a deviation of the right tooth surface. Similarly, the amounts of phase change of the grinding tool and the workpiece gear which are made in the second rotational speed changing step correspond to a deviation of the left tooth surface. Inasmuch as the changes in the phase of the grinding tool and the workpiece gear are recorded along the entire circumference of the workpiece gear, a deviation of the teeth of the workpiece gear with respect to the grinding tooth of the grinding tool can be measured highly accurately. Since the central positions of the teeth of the workpiece gear are calculated based on the recorded information, the meshing central positions of all the teeth of the workpiece gear with respect to the grinding tooth are found. Accordingly, since the meshing central positions of all the teeth of the workpiece gear with respect to the grinding tooth are not greatly displaced, the ground accuracy of the tooth surfaces of the workpiece gear is made higher than heretofore. Thus, since the mill scale of the workpiece gear can thus be reduced, the grinding tool can have an increased service life and a reduced grinding time.

In the fifth invention, the first rotational speed changing step may change the rotational speed of the workpiece gear, and the second rotational speed changing step may change the rotational speed of the workpiece gear. Thus, it is easy to associate the rotational positions of the workpiece gear and the amounts of phase change of the grinding tool and the workpiece gear with each other from the rotational amount (rotational position or rotational angle) of the workpiece gear, resulting in a simpler control process than if the rotational speed of the grinding tool is changed.

DESCRIPTION OF EMBODIMENTS

An apparatus for and a method of measuring a deviation of a tooth surface, an apparatus for and a method of forming a grinding tool, and a gear meshing method for a gear grinding apparatus according to embodiments of the present invention will be described below with reference to FIGS. 1 through 10.

First Embodiment

A first embodiment of the present invention will be described below with reference to FIGS. 1 through 6. Specifically, a grinding tool forming apparatus incorporating a tooth surface deviation measuring apparatus according to the first embodiment of the present invention will be described below.

Figure 1:
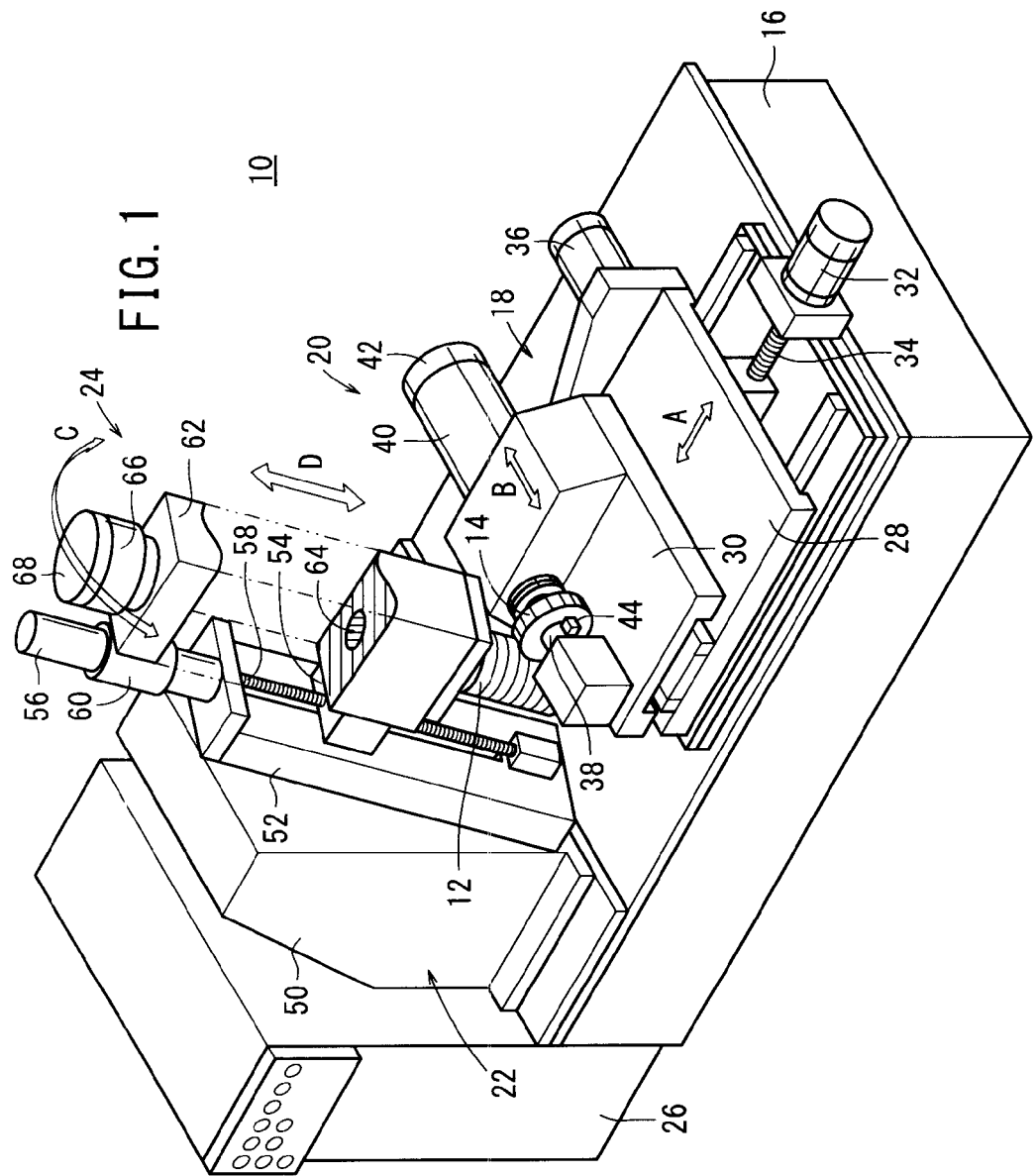
FIG. 1 is a perspective view of a grinding tool forming apparatus incorporating an apparatus for measuring a deviation of a tooth surface according to the present invention.
Figure 2:
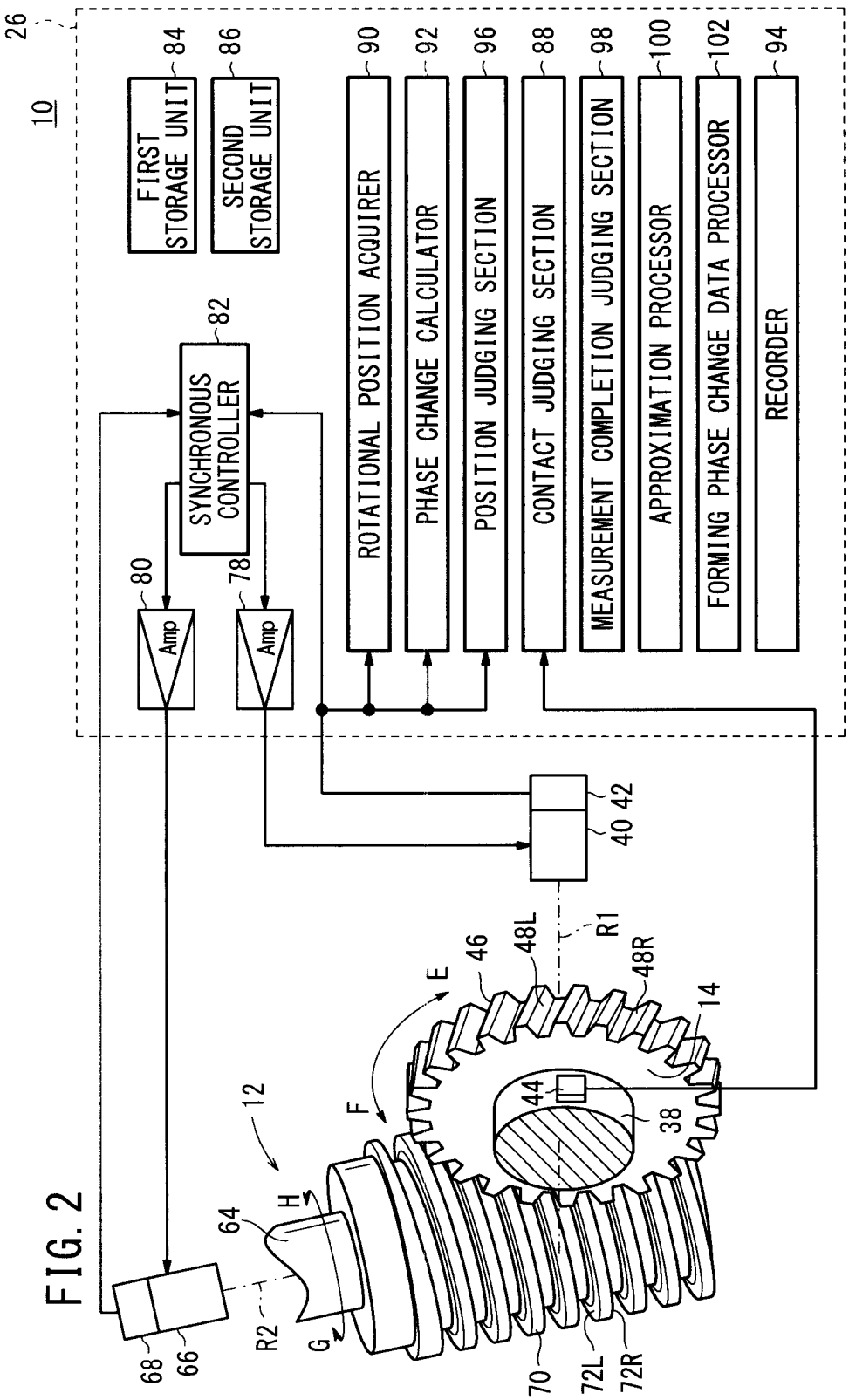
FIG. 2 is a block diagram showing the manner in which a grinding tool and a dresser gear are held in mesh with each other and an internal configuration of a controller according to a first embodiment.

The grinding tool forming apparatus, denoted by 10, is an apparatus for forming (dressing) a grinding tool 12 with a dresser gear 14. As shown in FIGS. 1 and 2, the grinding tool forming apparatus 10 includes a bed 16 placed on a horizontal surface in a factory or the like, a gear support mechanism 18 for supporting the dresser gear 14 on the bed 16 for movement along infeed directions (directions indicated by the arrow A) and directions (directions indicated by the arrow B) of the rotational axis R1 of the dresser gear 14, a gear rotating mechanism 20 mounted on the gear support mechanism 18 for rotating the dresser gear 14, a grinding tool support mechanism 22 for supporting the grinding tool 12 on the bed 16 for movement along swinging directions (directions indicated by the arrow C) and directions (directions indicated by the arrow D) of the rotational axis R2 of the grinding tool 12, a grinding tool rotating mechanism 24 mounted on the grinding tool support mechanism 22 for rotating the grinding tool 12, and a controller 26 disposed adjacent to the bed 16.

The gear support mechanism 18 includes an infeed table 28 supported on the bed 16 for to-and-fro movement along the directions indicated by the arrow A, and a traverse table 30 supported on the infeed table 28 for to-and-fro movement along the directions indicated by the arrow B. The infeed table 28 can be moved to and fro along the directions indicated by the arrow A by an infeed motor 32 and a ball screw mechanism 34. The traverse table 30 can be moved to and fro along the directions indicated by the arrow B by a traverse motor 36 and a ball screw mechanism (not shown).

The gear rotating mechanism 20, which is disposed on the traverse table 30, includes a gear shaft 38 for holding the dresser gear 14 removably therefrom, a first rotary motor 40 for rotating the dresser gear 14 clockwise in a normal direction (direction indicated by the arrow E) and counterclockwise in a reverse direction (direction indicated by the arrow F), as shown in FIG. 2, and a first encoder 42 for outputting a signal (pulsed signal) representative of the phase (rotational angle, rotational position, or rotational amount) of the dresser gear 14. A speed reducer mechanism, not shown, is operatively connected between the gear shaft 38 and the first rotary motor 40.

A contact detector 44 for detecting contact between the grinding tool 12 and the dresser gear 14 is mounted on the gear shaft 38 by a bearing (not shown). The contact detector 44 comprises a contact-type AE sensor which detects an elastic wave (contact sound) P that is produced when the grinding tool 12 and the dresser gear 14 contact each other. Alternatively, the contact detector 44 may comprise a contactless AE sensor, a vibration sensor or a torque sensor, or may use accumulated pulses. Accumulated pulses may be used in the manner disclosed in Japanese Patent No. 3910427, for example.

The dresser gear 14, which serves to form the grinding tool 12, has a plurality of dresser teeth 46 on its outer circumferential surface. Each of the dresser teeth 46 has left and right dresser tooth surfaces 48L, 48R for contacting the grinding tool 12. A diamond abrasive grain coating or the like, for example, is electrodeposited on each of the dresser tooth surfaces 48L, 48R with a plated nickel layer interposed therebetween.

The grinding tool support mechanism 22 has an upstanding column 50 mounted on the upper surface of the bed 16, a swivel table 52 supporting on a side surface of the column 50 for swinging movement along the directions indicated by the arrow C, and a shift table 54 supported on the swivel table 52 for to-and-fro movement along the directions indicated by the arrow D. The swivel table 52 can be swung along the directions indicated by the arrow C by a swivel motor, not shown. The shift table 54 can be moved to and fro along the directions indicated by the arrow D by a shift motor 56 and a ball screw mechanism 58. A speed reducer mechanism 60 is operatively connected between the shift motor 56 and the ball screw mechanism 58.

The grinding tool rotating mechanism 24 has a housing 62 fixed to the shift table 54, a grinding tool shaft 64 extending through the housing 62 and holding the grinding tool 12 removably therefrom, a second rotary motor 66 for rotating the grinding tool 12 clockwise in a normal direction (direction indicated by the arrow G) and counterclockwise in a reverse direction (direction indicated by the arrow H), as shown in FIG. 2, and a second encoder 68 for outputting a signal (pulsed signal) representative of the phase (rotational angle, rotational position, or rotational amount) of the grinding tool 12.

The grinding tool 12, which serves to grind a gear, not shown, has a helical grinding tooth 70 on its outer circumferential surface. The grinding tooth 70 has a right grinding tooth surface 72R corresponding to the left dresser tooth surface 48L of the dresser gear 14 and a left grinding tooth surface 72L corresponding to the right dresser tooth surface 48R of the dresser gear 14. The dresser gear 14 is controlled by the controller 26 to rotate while holding the grinding tooth 70 in mesh with the dresser teeth 46, thereby forming the right grinding tooth surface 72R of the grinding tool 12 with the left dresser tooth surface 48L of the dresser gear 14 and the left grinding tooth surface 72L of the grinding tool 12 with the right dresser tooth surface 48R of the dresser gear 14. A single layer of CBN (cubic boron nitride) abrasive grain is electrodeposited on each of the grinding tooth surfaces 72L, 72R with a plated nickel layer interposed therebetween.

As shown in FIG. 1, the controller 26 controls the infeed motor 32 to move the dresser gear 14 to and fro along the directions indicated by the arrow A, and also controls the traverse motor 36 to move the dresser gear 14 to and fro along the directions indicated by the arrow B. In addition, the controller 26 controls the swivel motor to swivel the grinding tool 12 along the directions indicated by the arrow C and also controls the shift motor 56 to move the grinding tool 12 to and fro along the directions indicated by the arrow D.

As shown in FIG. 2, the controller 26 includes a first servoamplifier 78, a second servoamplifier 80, a synchronous controller 82 as a rotational speed changing means, a first storage unit 84, a second storage unit 86, a contact judging section 88, a rotational position acquirer 90, a phase change calculator 92, a recorder 94, a position judging section 96, a measurement completion judging section 98, an approximation processor 100, and a forming phase change data processor 102.

Based on output signals respectively from the first encoder 42 and the second encoder 68, the synchronous controller 82 controls the first rotary motor 40 through the first servoamplifier 78 and also controls the second rotary motor 66 through the second servoamplifier 80 thereby rotating the dresser gear 14 and the grinding tool 12 in synchronism with each other. The synchronous controller 82 can change the rotational speed of the dresser gear 14 while rotating the dresser gear 14 and the grinding tool 12 in synchronism with each other.

The first storage unit 84 stores therein a contact judgment upper limit value $P_U$, a contact judgment lower limit value $P_L$, and formed quantity data. The contact judgment upper limit value $P_U$ refers to the magnitude of an elastic wave which is generated when the degree of contact between the dresser tooth surfaces 48L, 48R of the dresser gear 14 and the grinding tooth surfaces 72L, 72R of the grinding tool 12 is small enough not to form (not to wear) the grinding tooth surfaces 72L, 72R. The contact judgment lower limit value $P_L$, which is smaller than the contact judgment upper limit value $P_U$, refers to the magnitude of an elastic wave which is generated when the dresser tooth surfaces 48L, 48R and the grinding tooth surfaces 72L, 72R either contact each other to such an extent that they are essentially not in contact with each other or are completely out of contact with each other. The contact judgment upper limit value $P_U$ and the contact judgment lower limit value $P_L$ may be determined by way of experimentation. The formed quantity data refer to a desired formed quantity of CBN abrasive grain electrodeposited on the grinding tooth surfaces 72L, 72R.

The second storage unit 86 stores a phase change map. The phase change map may be a map that is representative of the relationship between rotational positions of the dresser gear 14 and amounts of phase change of the grinding tool 12 and the dresser gear 14 (see FIGS. 5 and 6), for example.

The contact judging section 88 judges whether the magnitude of the elastic wave detected by the contact detector 44 is greater than the contact judgment lower limit value $P_L$ and smaller than the contact judgment upper limit value $P_U$.

The rotational position acquirer 90 refers to the output signal from the first encoder 42, and acquires the rotational position of the dresser gear 14.

The phase change calculator 92 refers to the respective output signals from the first encoder 42 and the second encoder 68, and calculates amounts of phase change of the grinding tool 12 and the dresser gear 14.

The recorder 94 records the amounts of phase change, which have been calculated by the phase change calculator 92, between the grinding tool 12 and the dresser gear 14 in the phase change map.

The position judging section 96 judges whether the rotational position of the dresser gear 14, which has been acquired by the rotational position acquirer 90, has reached a position where phase changes are to be recorded in the phase change map or not.

The measurement completion judging section 98 judges whether the recorder 94 has finished the recording in the phase change map along the entire circumference of the dresser gear 14 or not.

The approximation processor 100 approximates the data recorded in the phase change map, whose measurement has been judged as completed by the measurement completion judging section 98, to a sine wave.

The forming phase change data processor 102 calculates forming phase change data based on the formed quantity data stored in the first storage unit 84 and the data approximated to the sine wave. The forming phase change data refer to data representative of amounts of phase change of the grinding tool 12 and the dresser gear 14 with respect to rotational positions of the dresser gear 14, taking into account the formed quantity data.

Figure 3:
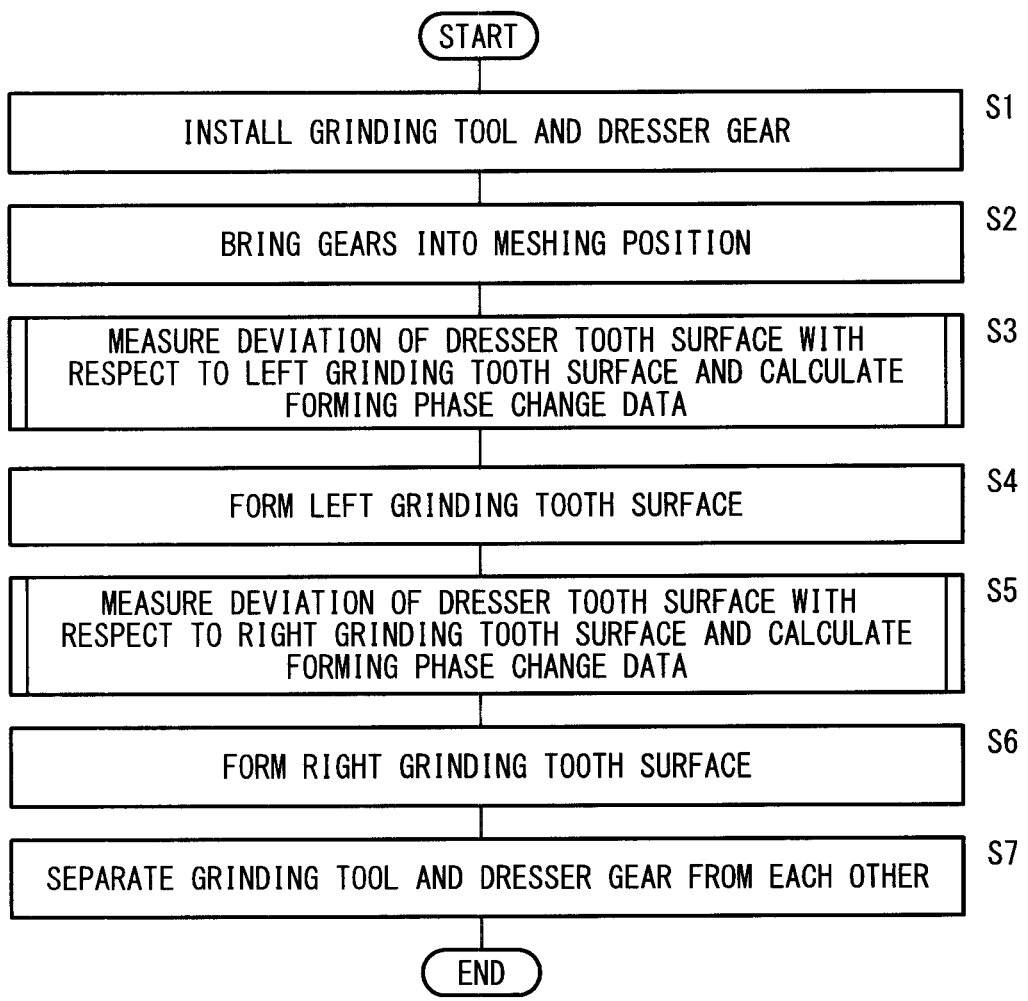
FIG. 3 is a flowchart of a main routine of a process for forming a grinding tooth surface.
Figure 4:
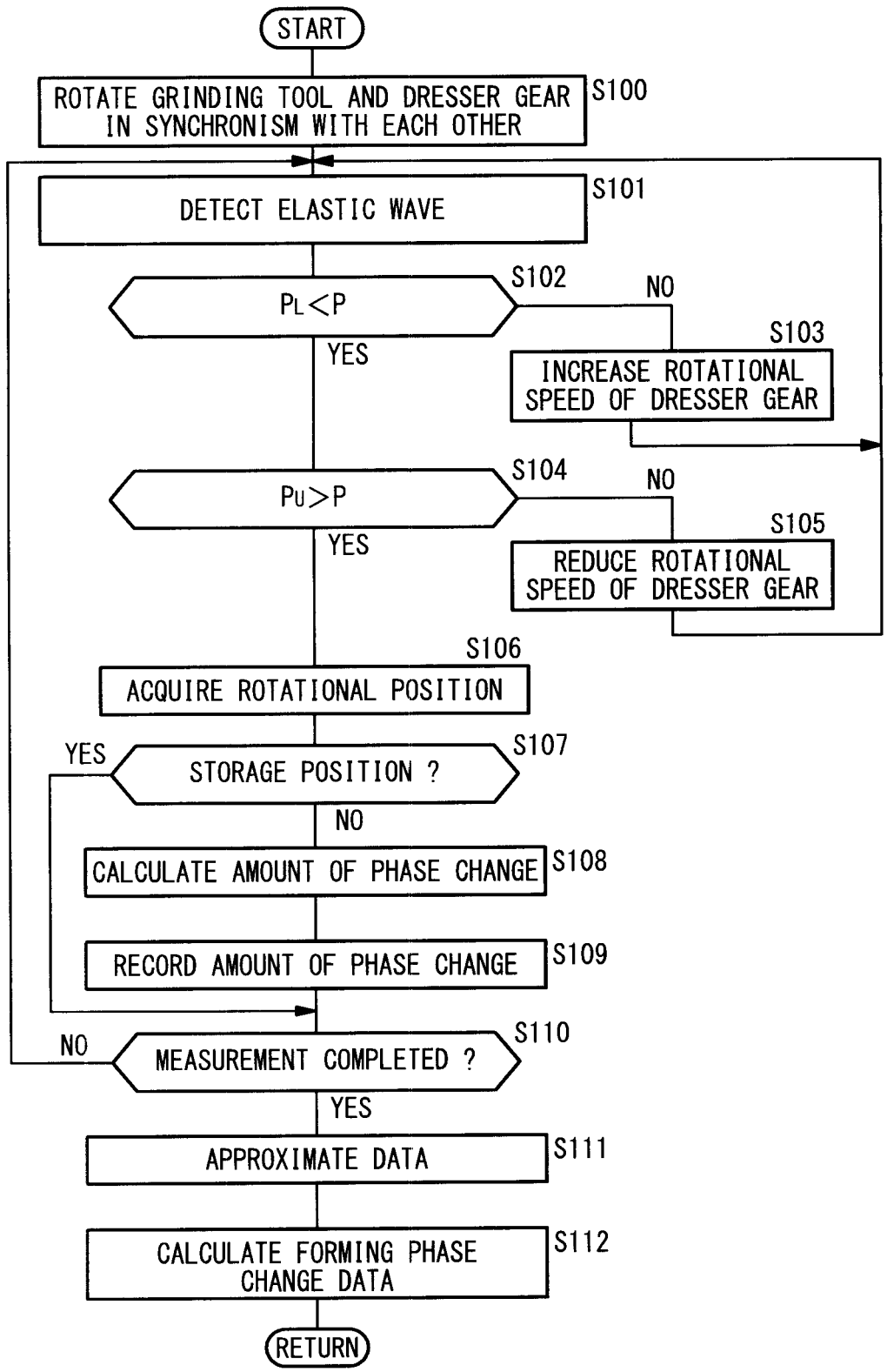
FIG. 4 is a flowchart of a subroutine of the flowchart shown in FIG. 3.

A process for forming the grinding tooth surfaces 72L, 72R with the dresser tooth surfaces 48L, 48R will be described below with reference to flowcharts shown in FIGS. 3 and 4. FIG. 3 shows a main routine, and FIG. 4 shows a subroutine in each of steps S3, S5 shown in FIG. 3.

As shown in FIG. 3, the grinding tool 12 is installed on the grinding tool shaft 64, and the dresser gear 14 is installed on the gear shaft 38 (step S1).

Then, the controller 26 controls the infeed motor 32, the traverse motor 36, the swivel motor and the shift motor 56 to bring the grinding tool 12 and the dresser gear 14 into mesh with each other so that the grinding tooth surfaces 72L, 72R of the grinding tool 12 and the dresser tooth surfaces 48R, 48L can contact each other (step S2).

Thereafter, the controller 26 measures a deviation of the right dresser tooth surface 48R with respect to the left grinding tooth surface 72L, and calculates forming phase change data (step S3). Specifically, the controller 26 executes the subroutine shown in FIG. 4.

As shown in FIG. 4, based on output signals respectively from the first encoder 42 and the second encoder 68, the synchronous controller 82 controls the first rotary motor 40 through the first servoamplifier 78 and also controls the second rotary motor 66 through the second servoamplifier 80 thereby rotating the dresser gear 14 and the grinding tool 12 in synchronism with each other (step S100). At this time, the synchronous controller 82 controls the first rotary motor 40 to rotate the dresser gear 14 along the direction indicated by the arrow F, and controls the second rotary motor 66 to rotate the grinding tool 12 along the direction indicated by the arrow G. The left grinding tooth surface 72L and the right dresser tooth surface 48R can now contact each other.

Then, the contact detector 44 detects the magnitude of an elastic wave R that is generated when the grinding tool 12 and the dresser gear 14 are brought into contact with each other (step S101).

At this time, the contact judging section 88 judges whether the magnitude of the elastic wave P detected by the contact detector 44 is greater than the contact judgment lower limit value $P_L$ or not (step S102). Stated otherwise, the contact judging section 88 judges whether or not the left grinding tooth surface 72L and the right dresser tooth surface 48R either contact each other to such an extent that they are essentially not in contact with each other or are completely out of contact with each other. The contact judging section 88 acquires the contact judgment lower limit value $P_L$ by referring to the first storage unit 84. If the contact judging section 88 makes a negative judgment, then the synchronous controller 82 controls the first rotary motor 40 to increase the rotational speed of the dresser gear 14 by a prescribed quantity (step S103). The left grinding tooth surface 72L and the right dresser tooth surface 48R can now be brought into appropriate contact with each other. Thereafter, control goes back to step S101.

If the contact judging section 88 makes an affirmative judgment in step S102, then the contact judging section 88 judges whether the magnitude of the elastic wave P detected by the contact detector 44 is smaller than the contact judgment upper limit value $P_U$ or not (step S104). Stated otherwise, the contact judging section 88 judges whether or not the left grinding tooth surface 72L and the right dresser tooth surface 48R are not in such a contact state that the left grinding tooth surface 72L should be formed. The contact judging section 88 acquires the contact judgment upper limit value $P_U$ by referring to the first storage unit 84. If the contact judging section 88 makes a negative judgment, then the synchronous controller 82 controls the first rotary motor 40 to reduce the rotational speed of the dresser gear 14 by a prescribed quantity (step S105). The degree of contact between the left grinding tooth surface 72L and the right dresser tooth surface 48R is now reduced. Thereafter, control goes back to step S101.

If the contact judging section 88 makes an affirmative judgment in step S104, then the rotational position acquirer 90 refers to the output signal from the first encoder 42, and acquires the rotational position of the dresser gear 14 (step S106). The position judging section 96 judges whether the rotational position acquired by the rotational position acquirer 90 has reached a position where phase changes are to be recorded in the phase change map or not (step S107). Stated otherwise, the position judging section 96 judges whether the rotational position acquired by the rotational position acquirer 90 has already been recorded in the phase change map or not. The position judging section 96 acquires the phase change map by referring to the second storage unit 86.

If the position judging section 96 makes a negative judgment in step S107, then the phase change calculator 92 refers to the respective output signals from the first encoder 42 and the second encoder 68, and calculates an amount of phase change of the grinding tool 12 and the dresser gear 14 with respect to the rotational position acquired in step S106 (step S108). The recorder 94 records the amount of phase change calculated in step S108 in the phase change map that is stored in the second storage unit 86 (step S109).

If the position judging section 96 makes an affirmative judgment in step S107, then control skips steps S108 and S109, and jumps to step S110.

Thereafter, the measurement completion judging section 98 judges whether the recorder 94 has recorded phase changes in the phase change map along the entire circumference of the dresser gear 14 or not (step S110). If the measurement completion judging section 98 makes a negative judgment, then control goes back to step S101.

Figure 5:
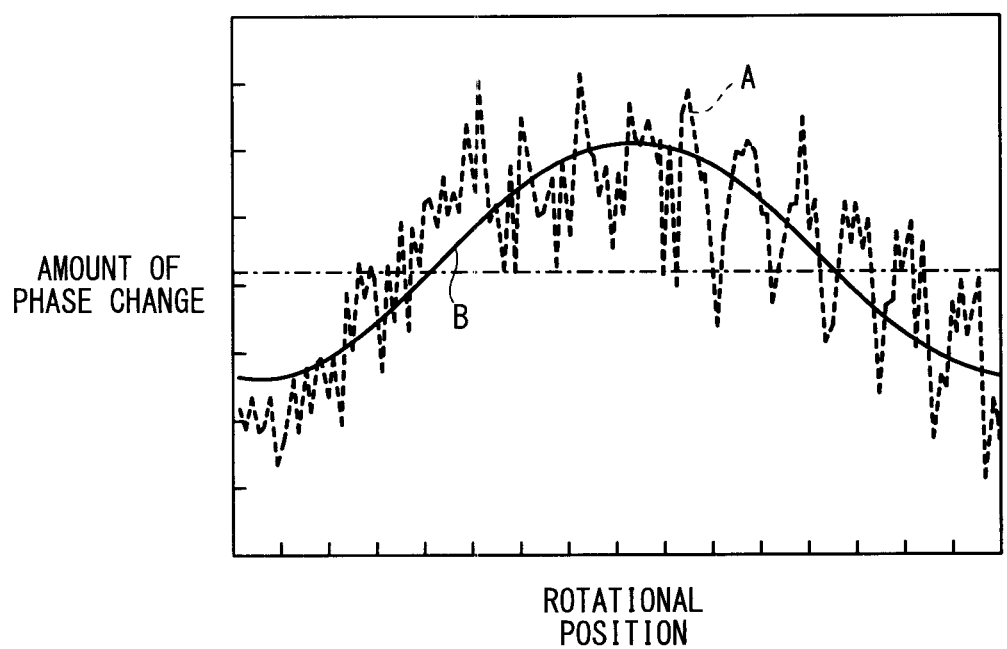
FIG. 5 is a graph showing measured phase changes with respect to rotational positions of a dresser gear and an approximate waveform which approximates the measured phase changes.

If the measurement completion judging section 98 makes an affirmative judgment in step S110, then the approximation processor 100 approximates the data recorded in the phase change map, whose measurement has been completed (step S111). Specifically, as shown in FIG. 5, the approximation processor 100 approximates the data recorded in the phase change map to a sine wave represented by $A \sin(\theta+P)$ according to the expressions (1) through (4) shown below. In FIG. 5, the horizontal axis indicates rotational positions (rotational angles) of the dresser gear 14 and the vertical axis indicates amounts of phase change of the grinding tool 12 and the dresser gear 14. The broken-line curve A indicates a measured waveform, and the solid-line curve B indicates an approximate waveform which approximates the measured waveform to a sine wave. In FIG. 5, the cyclic period of the approximate waveform corresponds to the entire circumference of the dresser gear 14. The data recorded in the phase change map can thus be handled as an approximate waveform which approximates the measured waveform to a sine wave.

$$lc = \frac{1}{2\pi} \int_0^{2\pi} x(\theta)\cos(\theta)\, d\theta \quad (1)$$

$$ls = \frac{1}{2\pi} \int_0^{2\pi} x(\theta)\sin(\theta)\, d\theta \quad (2)$$

-continued $$A = 2\sqrt{lc^2 + ls^2} \quad (3)$$

$$P = \tan^{-1}\left(\frac{lc}{ls}\right) \quad (4)$$

Figure 6:
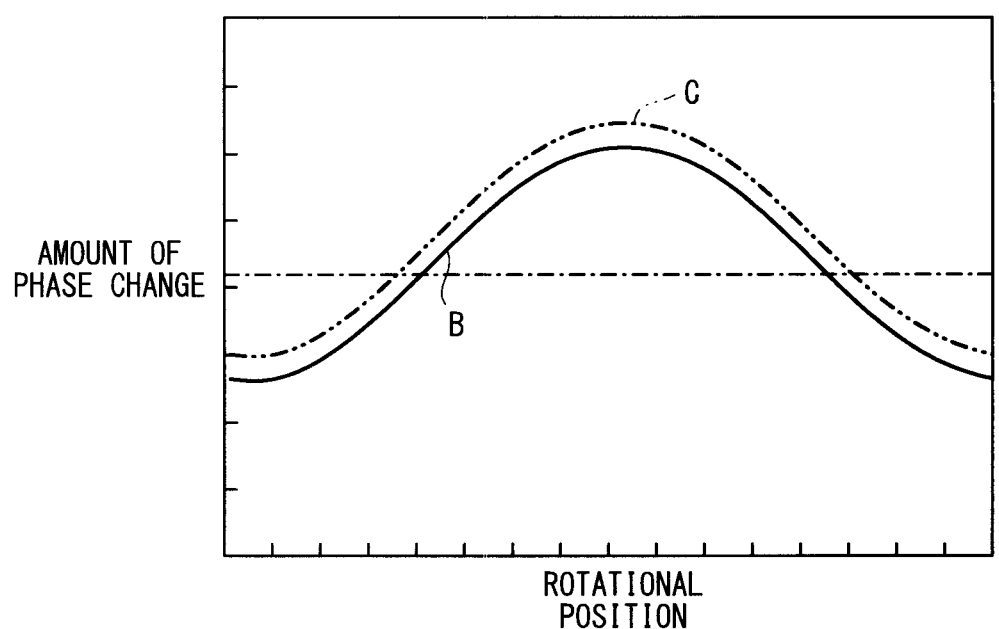
FIG. 6 is a graph showing the approximate waveform shown in FIG. 5 and a waveform representative of forming phase change data calculated based on the approximate waveform.

Thereafter, the forming phase change data processor 102 calculates forming phase change data by adding the formed quantity data to the approximate waveform determined by the approximation processor 100 (step S112). Specifically, the forming phase change data processor 102 adds finalizing phase change data to the approximate waveform determined by the approximation processor 100. Stated otherwise, as shown in FIG. 6, the forming phase change data processor 102 shifts the approximate waveform determined by the approximation processor 100 in a positive direction along the vertical axis by the finalizing phase change data. In FIG. 6, the horizontal axis indicates rotational positions (rotational angles) of the dresser gear 14 and the vertical axis indicates amounts of phase change of the grinding tool 12 and the dresser gear 14. The solid-line curve B indicates the approximate waveform determined by the approximation processor 100, and the two-dot-and-dash-line curve C indicates a waveform representative of forming speed data. The finalizing phase change data represent amounts of phase change (finalizing quantities) of the grinding tool 12 and the dresser gear 14 that are required to form the grinding tool 12 by the formed quantity data from the state wherein the left grinding tooth surface 72L and the right dresser tooth surface 48R contact each other. The forming phase change data processor 102 acquires the formed quantity data by referring to the first storage unit 84.

Thereafter, control goes back to the main routine shown in FIG. 3, and the dresser gear 14 forms the left grinding tooth surface 72L (step S4). Specifically, the synchronous controller 82 rotates the grinding tool 12 and the dresser gear 14 in synchronism with each other based on the forming phase change data calculated in step S112 shown in FIG. 4.

When the formation of the left grinding tooth surface 72L is finished, the controller 26 measures a deviation of the left dresser tooth surface 48L with respect to the right grinding tooth surface 72R, and calculates forming phase change data (step S5). Specifically, the controller 26 executes the subroutine of step S3 (steps S100 through S112) where the left grinding tooth surface 72L is replaced with the right grinding tooth surface 72R and the right dresser tooth surface 48R is replaced with the left dresser tooth surface 48L.

Thereafter, the dresser gear 14 forms the right grinding tooth surface 72R (step S6).

When the formation of the grinding tooth surfaces 72L, 72R is finished, the controller 26 separates the grinding tool 12 and the dresser gear 14 away from each other (step S7). Thereafter, the main routine is ended.

According to the present embodiment, the second storage unit 86, the rotational position acquirer 90, the phase change calculator 92, the recorder 94, the position judging section 96 and the measurement completion judging section 98 jointly correspond to a measuring device, and the measuring device, the contact detector 44, the first and second servoamplifiers 78, 80, the synchronous controller 82, the first storage unit 84 and the contact judging section 88 jointly correspond to a tooth surface deviation measuring apparatus. Step S100 corresponds to a synchronous rotating step, step S101 a detecting step, steps S103 and S105 a rotational speed changing step, steps S106 through S110 a measuring step, step S109 a recording step, and step S112 a forming phase change data calculating step.

According to the present embodiment, as described above, the synchronous controller 82 increases or reduces the rotational speed of the dresser gear 14 such that the output result by the contact detector 44 is greater than the contact judgment lower limit value $P_L$ or smaller than the contact judgment upper limit value $P_U$. Therefore, the grinding tooth surfaces 72L, 72R of the grinding tool 12 and the dresser tooth surfaces 48R, 48L of the dresser gear 14 keep contacting each other to a prescribed contact degree. Consequently, the amounts of phase change of the grinding tool 12 and the dresser gear 14 that are caused by the synchronous controller 82 correspond to a deviation of the dresser gear 14. Since the amounts of phase change of the grinding tool 12 and the dresser gear 14 with respect to the rotational positions of the dresser gear 14 are recorded in the phase change map along the entire circumference of the dresser gear 14, deviations of the dresser tooth surfaces 48R, 48L of the dresser gear 14 with respect to the grinding tooth surfaces 72L, 72R of the grinding tool 12 can be measured highly accurately.

Furthermore, since an amount of forming phase change representative of the information recorded by the recorder 94 with formed quantities of the grinding tooth surfaces 72L, 72R added thereto is calculated, the calculated amount of forming phase change includes the deviations and the formed quantities. Thus, when the grinding tool 12 and the dresser gear 14 are rotated synchronously based on the calculated amount of forming phase change, the effect of the deviations of the dresser tooth surfaces 48R, 48L which occur when the grinding tool 12 is formed can be ignored. The formed accuracy of the grinding tool 12 is thus increased. Furthermore, since the amount of forming phase change is calculated along the entire circumference of the dresser gear 14, the grinding tool 12 can be formed using the entire circumference of the dresser gear 14. The forming capability of the dresser gear 14 is thus increased.

If the synchronous controller 82 changes the rotational speed of the grinding tool 12 thereby to keep the dresser tooth surfaces 48R, 48L and the grinding tooth surfaces 72L, 72R in contact with each other to a prescribed contact degree, then it is necessary for the synchronous controller 82 to acquire rotational positions of the dresser gear 14 from the output signal from the first encoder 42 and also to calculate an amount of phase change of the grinding tool 12 and the dresser gear 14 based on the output signal from the second encoder 68. In addition, since the rotational positions of the dresser gear 14 and the amount of phase change of the grinding tool 12 and the dresser gear 14 need to be associated with each other, a complex control process is required.

According to the present embodiment, on the other hand, inasmuch as the synchronous controller 82 changes the rotational speed of the dresser gear 14 thereby to keep the grinding tooth surfaces 72L, 72R of the grinding tool 12 and the dresser tooth surfaces 48R, 48L of the dresser gear 14 in contact with each other to a prescribed contact degree, it is easy for the synchronous controller 82 to associate the rotational positions of the dresser gear 14 and the amounts of phase change of the grinding tool 12 and the dresser gear 14 with each other, resulting in a simpler controller process than if the synchronous controller 82 changes the rotational speed of the grinding tool 12.

According to the present embodiment, if the position judging section 96 decides that the rotational position of the dresser gear 14 which has been acquired by the rotational position acquirer 90 has reached a position where phase changes are to be recorded in the recorder 94, then the phase change calculator 92 does not calculate a rotational speed of the dresser gear 14. Therefore, the phase change calculator 92 does not calculate amounts of phase change of the grinding tool 12 and the dresser gear 14 a plurality of times at the same rotational position. Accordingly, amounts of phase change of the grinding tool 12 and the dresser gear 14 with respect to rotational positions of the dresser gear 14 can efficiently be recorded.

The first embodiment is not limited to the illustrated arrangement. In the first embodiment, the synchronous controller changes the rotational speed of the dresser gear so that the dresser tooth surfaces and the grinding tooth surfaces are kept in contact with each other to a prescribed contact degree, i.e., so that the detection result by the contact detector falls within a prescribed range. However, the synchronous controller may change the rotational speed of the grinding tool so that the dresser tooth surfaces and the grinding tooth surfaces are kept in contact with each other to a prescribed contact degree.

In the present embodiment, the measurement completion judging section 98 judges whether the recorder 94 has recorded phase changes in the phase change map along the entire circumference of the dresser gear 14 or not. However, the measurement completion judging section 98 may judge whether the recorder 94 has recorded phase changes in the phase change map along a prescribed circumferential range (e.g., one half of the entire circumference) of the dresser gear 14 or not.

Even in such a case, the formed accuracy of the grinding tool 12 is increased because the effect of the deviations of the dresser tooth surfaces 48R, 48L which occur when the grinding tool 12 is formed is reduced. Even when the grinding tool 12 is formed using the entire circumference (all teeth) of the dresser gear 14, the formed accuracy of the grinding tool 12 is prevented from becoming lower. Consequently, the formed accuracy of the grinding tool 12 is increased, and the forming capability of the dresser gear 14 is increased.

Second Embodiment

A second embodiment of the present invention will be described below with reference to FIGS. 7 through 10. Specifically, a gear grinding apparatus incorporating a tooth surface deviation measuring apparatus according to the second embodiment of the present invention will be described below. The gear grinding apparatus, denoted by 200, is generally of the same structure as the grinding tool forming apparatus 10 according to the first embodiment. Those parts of the gear grinding apparatus 200 which are in common with those of the first embodiment are denoted by identical reference characters, and will not be described in detail below.

Figure 7:
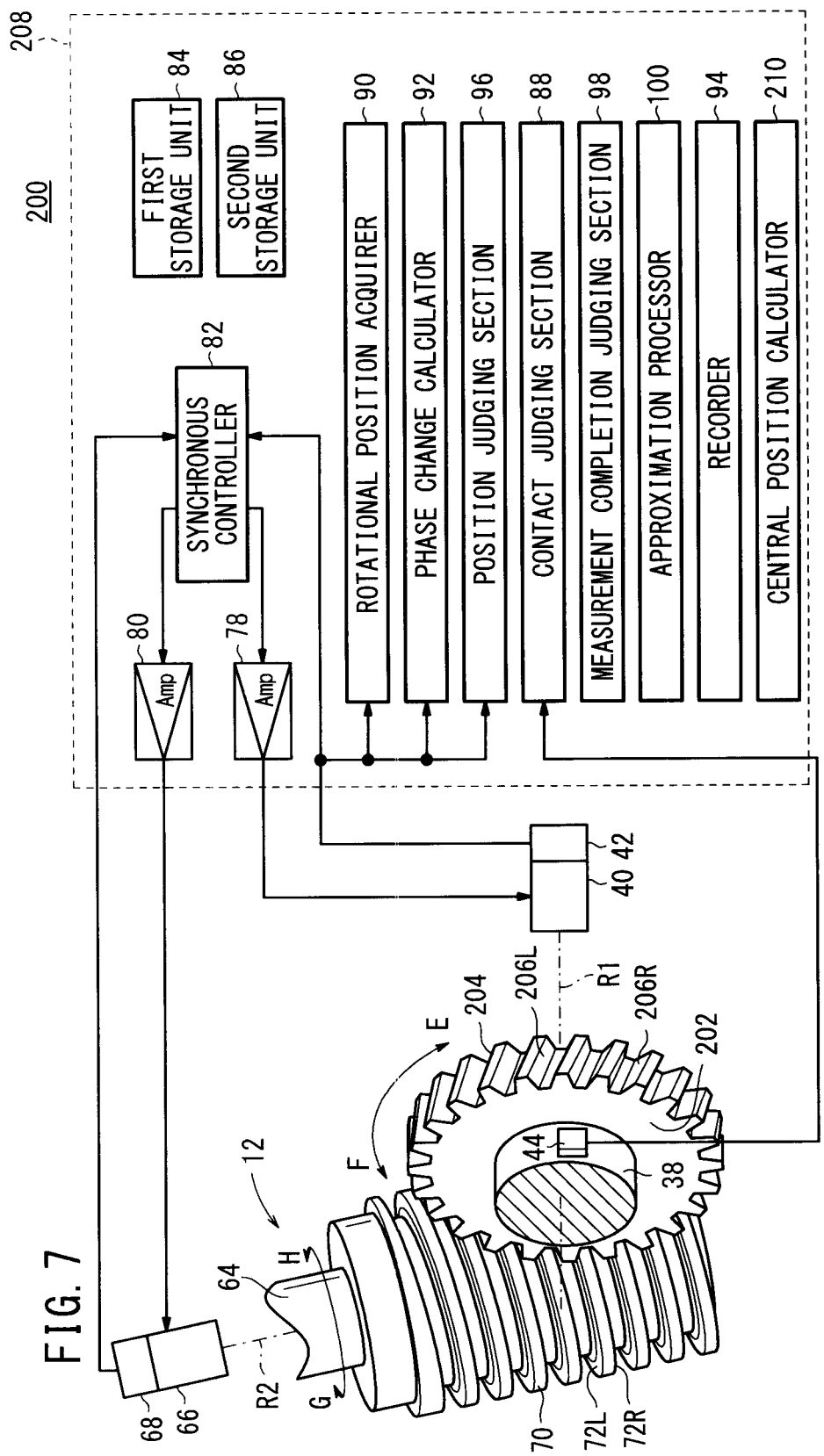
FIG. 7 is a block diagram showing the manner in which a grinding tool and a workpiece gear are held in mesh with each other and an internal configuration of a controller according to a second embodiment.

As shown in FIG. 7, the gear grinding apparatus 200 includes a workpiece gear 202 to be ground, instead of the dresser gear 14 according to the first embodiment. The gear grinding apparatus 200 is an apparatus for grinding the workpiece gear 202 by use of the grinding tool 12. The workpiece gear 202 has a plurality of teeth 204 on its outer circumference. Each of the teeth 204 has a right tooth surface 206R corresponding to the left grinding tooth surface 72L of the grinding tool 12 and a left tooth surface 206L corresponding to the right grinding tooth surface 72R of the grinding tool 12. The grinding tool 12 is controlled by a controller 208 to rotate while holding the grinding tooth 70 in mesh with the teeth 204 of the workpiece gear 202, thereby grinding the right tooth surface 206R of the workpiece gear 202 with the left grinding tooth surface 72L of the grinding tool 12 and the left tooth surface 206L of the workpiece gear 202 with the right grinding tooth surface 72R of the grinding tool 12.

The controller 208 of the gear grinding apparatus 200 is devoid of the forming phase change data processor 102 according to the first embodiment, and further includes a central position calculator 210. The central position calculator 210 calculates a central position (initial phase) of a tooth 204 of the workpiece gear 202 with respect to the grinding tooth 70 of the grinding tool 12 at the time the tooth 204 and the grinding tooth 70 are held in mesh with each other.

Figure 8:
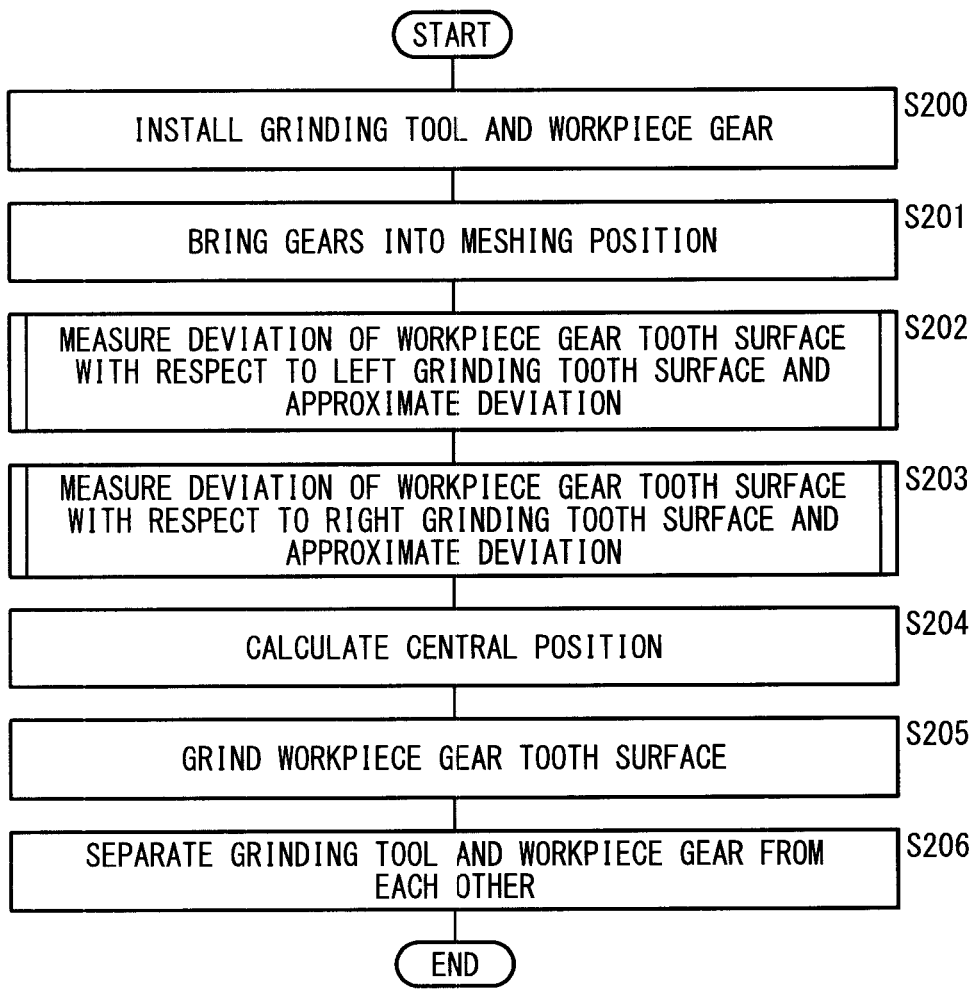
FIG. 8 is a flowchart of a main routine of a process for grinding a tooth surface of the workpiece gear.
Figure 9:
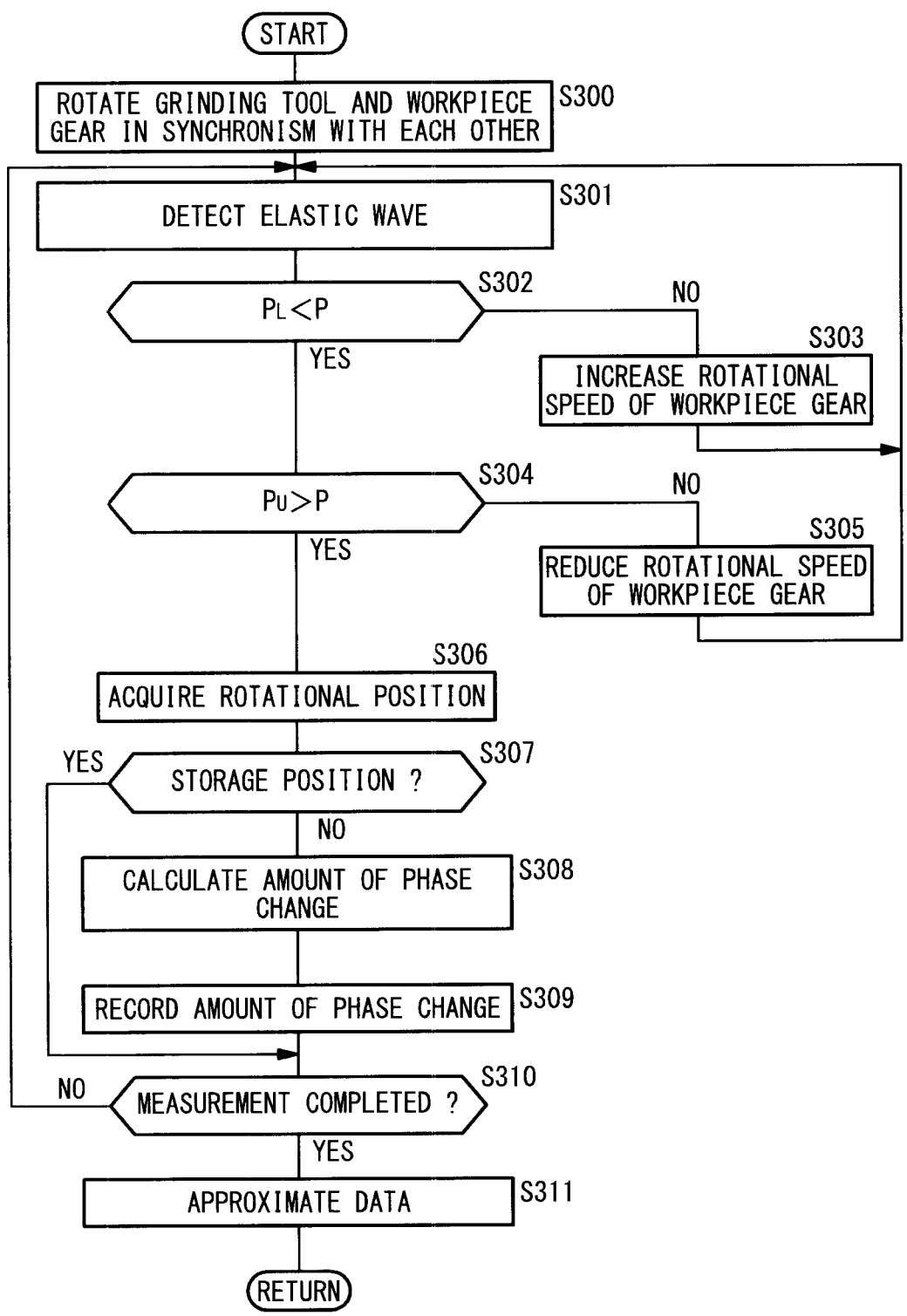
FIG. 9 is a flowchart of a subroutine of the flowchart shown in FIG. 8.

A process for grinding the tooth surfaces 206R, 206L of the workpiece gear 202 with the grinding tooth surfaces 72L, 72R will be described below with reference to flowcharts shown in FIGS. 8 and 9. FIG. 8 shows a main routine, and FIG. 9 shows a subroutine in each of steps S202, S203 shown in FIG. 8. Control details which are in common with the control details which have been described above according to the first embodiment are not described below.

As shown in FIG. 8, the grinding tool 12 is installed on the grinding tool shaft 64, and the workpiece gear 202 is installed on the gear shaft 38 (step S200).

Then, the controller 208 controls the infeed motor 32, the traverse motor 36, the swivel motor, and the shift motor 56 to bring the grinding tool 12 and the gear 202 into mesh with each other so that the grinding tooth surfaces 72L, 72R of the grinding tool 12 and the tooth surfaces 206R, 206L of the workpiece gear 202 can contact each other (step S201).

Thereafter, the controller 208 measures a deviation of the tooth surface 206R with respect to the left grinding tooth surface 72L, and approximates the measured deviation (step S202). Specifically, the controller 208 executes the subroutine shown in FIG. 9.

As shown in FIG. 9, based on output signals respectively from the first encoder 42 and the second encoder 68, the synchronous controller 82 controls the first rotary motor 40 through the first servoamplifier 78 and also controls the second rotary motor 66 through the second servoamplifier 80 thereby rotating the workpiece gear 202 and the grinding tool 12 in synchronism with each other (step S300). At this time, the synchronous controller 82 controls the first rotary motor 40 to rotate the workpiece gear 202 along the direction indicated by the arrow F, and controls the second rotary motor 66 to rotate the grinding tool 12 along the direction indicated by the arrow G. The left grinding tooth surface 72L and the right tooth surface 206R now can contact each other.

Then, the contact detector 44 detects the magnitude of an elastic wave P that is generated when the grinding tool 12 and the workpiece gear 202 are brought into contact with each other (step S301).

At this time, the contact judging section 88 judges whether the magnitude of the elastic wave P detected by the contact detector 44 is greater than the contact judgment lower limit value $P_L$ or not (step S302). Stated otherwise, the contact judging section 88 judges whether or not the left grinding tooth surface 72L and the right tooth surface 206R either contact each other to such an extent that they are essentially not in contact with each other or are completely out of contact with each other. The contact judging section 88 acquires the contact judgment lower limit value $P_L$ by referring to the first storage unit 84. If the contact judging section 88 makes a negative judgment, then the synchronous controller 82 controls the first rotary motor 40 to increase the rotational speed of the workpiece gear 202 by a prescribed quantity (step S303). The left grinding tooth surface 72L and the right tooth surface 206R can now be brought into appropriate contact with each other. Thereafter, control goes back to step S301.

If the contact judging section 88 makes an affirmative judgment in step S302, then the contact judging section 88 judges whether the magnitude of the elastic wave P detected by the contact detector 44 is smaller than the contact judgment upper limit value $P_U$ or not (step S304). Stated otherwise, the contact judging section 88 judges whether or not the left grinding tooth surface 72L and the right tooth surface 206R are not in such a contact state that the left grinding tooth surface 72L should be formed. The contact judging section 88 acquires the contact judgment upper limit value $P_U$ by referring to the first storage unit 84. If the contact judging section 88 makes a negative judgment, then the synchronous controller 82 controls the first rotary motor 40 to reduce the rotational speed of the workpiece gear 202 by a prescribed quantity (step S305). The degree of contact between the left grinding tooth surface 72L and the right tooth surface 206R is now reduced. Thereafter, control goes back to step S301.

If the contact judging section 88 makes an affirmative judgment in step S304, then the rotational position acquirer 90 refers to the output signal from the first encoder 42, and acquires the rotational position of the workpiece gear 202 (step S306). The position judging section 96 judges whether the rotational position acquired by the rotational position acquirer 90 has reached a position where phase changes are to be recorded in the phase change map or not (step S307). The position judging section 96 acquires the phase change map by referring to the second storage unit 86.

If the position judging section 96 makes a negative judgment in step S307, then the phase change calculator 92 refers to the output signal from the first encoder 42, and calculates an amount of phase change of the grinding tool 12 and the gear 202 with respect to the rotational position acquired in step S306 (step S308). The recorder 94 records the amount of phase change calculated in step S308 in the phase change map that is stored in the second storage unit 86 (step S309).

If the position judging section 96 makes an affirmative judgment in step S307, then control skips steps S308 and S309, and jumps to step S310.

Thereafter, the measurement completion judging section 98 judges whether the recorder 94 has recorded phase changes in the phase change map along the entire circumference of the workpiece gear 202 or not (step S310). If the measurement completion judging section 98 makes a negative judgment, then control goes back to step S301.

If the measurement completion judging section 98 makes an affirmative judgment in step S310, then the approximation processor 100 approximates the data recorded in the phase change map, whose measurement has been completed (step S311). Specifically, the approximation processor 100 approximates the data recorded in the phase change map to a sine wave represented by A sin (θ+P). The data recorded in the phase change map can thus be handled as an approximate waveform which approximates the measured waveform to a sine wave.

Thereafter, control goes back to the main routine shown in FIG. 8. The controller 208 measures a deviation of the left tooth surface 206L of the workpiece gear 202 with respect to the right grinding tooth surface 72R, and approximates the measured deviation (step S203). Specifically, the controller 208 executes the subroutine of step S202 (steps S300 through S311) where the left grinding tooth surface 72L is replaced with the right grinding tooth surface 72R and the right tooth surface 206R is replaced with the left tooth surface 206L.

Figure 10:
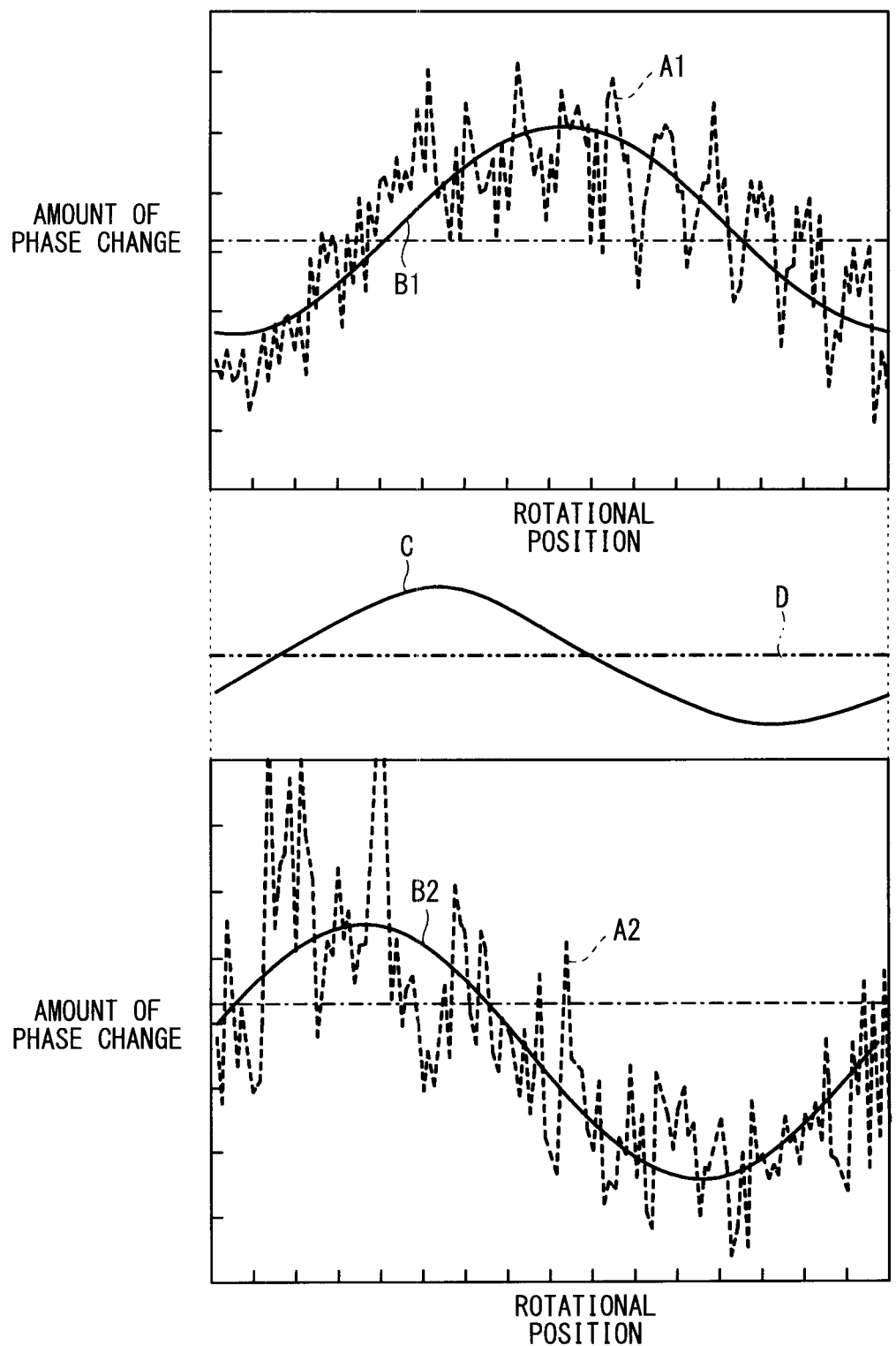
FIG. 10 is a set of graphs showing an approximate waveform with respect to a left grinding tooth surface and an approximate waveform with respect to a right grinding tooth surface, and a diagram showing calculated waveforms representative of central positions of the workpiece gear with respect to a grinding tooth at respective rotational positions of the gear, and an average central position calculated based on the calculated waveform.

Thereafter, the central position calculator 210 calculates a central position of the tooth 204 of the workpiece gear 202 with respect to the grinding tooth 70 of the grinding tool 12 at the time the grinding tooth 70 and the tooth 204 are held in mesh with each other, based on the approximate waveform calculated in step S202 and the approximate waveform calculated in step S203 (step S204). Specifically, as shown in FIG. 10, the central position calculator 210 calculates respective central positions of the teeth 204 of the workpiece gear 202 with respect to the grinding tooth 70 at the respective rotational positions (teeth) of the workpiece gear 202, based on the approximate waveform, denoted by B1, calculated in step S202 and the approximate waveform, denoted by B2, calculated in step S203 (see a calculated waveform C). Then, the central position calculator 210 calculates an average (average central position) of the central positions calculated respectively at the rotational positions of the workpiece gear 202 (see a calculated value D).

After the grinding tooth 70 of the grinding tool 12 and the teeth 204 of the workpiece gear 202 are brought into mesh with each other based on the calculation result in step S204, the tooth surfaces 206L, 206R of the workpiece gear 202 are ground (step S205).

When the grinding of the tooth surfaces 206L, 206R of the workpiece gear 202 is finished, the controller 208 separates the grinding tool 12 and the workpiece gear 202 away from each other (step S206). Thereafter, the main routine is ended.

According to the present embodiment, step S300 corresponds to a synchronous rotating step, step S301 a detecting step, steps S303 and S305 in step S202 a first rotational speed changing step, steps S303 and S305 in step S203 a second rotational speed changing step, steps S306 through S310 a measuring step, step S309 a recording step, and step S204 a calculating step.

As described above, the present embodiment offers the same advantages as the first embodiment. In other words, deviations of the tooth surfaces 206R, 206L of the workpiece gear 202 with respect to the grinding tooth surfaces 72L, 72R of the grinding tool 12 can be measured highly accurately.

In step S204, the central positions of the teeth 204 of the workpiece gear 202 with respect to the grinding tooth 70 of the grinding tool 12 at the time the grinding tooth 70 and the teeth 204 are held in mesh with each other are calculated based on the information recorded in the recorder 94. Therefore, the meshing central positions of all the teeth of the workpiece gear 202 with respect to the grinding tooth 70 are found. Accordingly, since the meshing central positions of all the teeth of the workpiece gear 202 with respect to the grinding tooth 70 are not greatly displaced, the ground accuracy of the tooth surfaces 206L, 206R of the workpiece gear 202 is made higher than heretofore. Since the mill scale of the workpiece gear 202 can thus be reduced, the grinding tool can have an increased service life and a reduced grinding time.

According to the present embodiment, the synchronous controller 82 changes the rotational speed of the workpiece gear 202 thereby to keep the grinding tooth surfaces 72L, 72R of the grinding tool 12 and the tooth surfaces 206R, 206L of the workpiece gear 202 in contact with each other to a prescribed contact degree. Consequently, it is easy for the synchronous controller 82 to associate the rotational positions of the workpiece gear 202 and the amounts of phase change of the grinding tool 12 and the workpiece gear 202 with each other, resulting in a simpler control process than if the synchronous controller 82 changes the rotational speed of the grinding tool 12.

In the second embodiment, the synchronous controller changes the rotational speed of the workpiece gear so that the tooth surfaces of the workpiece gear and the grinding tooth surfaces are kept in contact with each other to a prescribed contact degree, i.e., so that the detection result by the contact detector falls within a prescribed range. However, the synchronous controller may change the rotational speed of the grinding tool so that the tooth surfaces and the grinding tooth surfaces are kept in contact with each other to a prescribed contact degree.

The present invention is not limited to the above embodiments, but may adopt various arrangements without departing from the scope of the invention.

The invention claimed is:

1. A tooth surface deviation measuring apparatus for measuring a deviation of a tooth surface of a gear with respect to a helical grinding tooth surface of a grinding tool when the grinding tool and the gear rotate in synchronism with each other while the grinding tooth surface of the grinding tool and the tooth surface of the gear are capable of being held in contact with each other, comprising:
    a contact detector for detecting contact between the grinding tooth surface and the tooth surface;
    a rotational speed changing device that is adapted to change a rotational speed of either one of the grinding tool and the gear such that the detection result by the contact detector falls within a prescribed range; and
    a measuring device for measuring an amount of phase change of the grinding tool and the gear, which are made by the rotational speed changing device, along an entire circumference of the gear.

2. The tooth surface deviation measuring apparatus according to claim 1, wherein the rotational speed changing device changes the rotational speed of the gear.

3. The tooth surface deviation measuring apparatus according to claim 1, wherein the contact detector comprises an AE sensor.

4. A tooth surface deviation measuring method of measuring a deviation of a tooth surface of a gear with respect to a helical grinding tooth surface of a grinding tool when the grinding tool and the gear rotate in synchronism with each other while the grinding tooth surface of the grinding tool and the tooth surface of the gear are capable of being held in contact with each other, comprising the steps of:
    a detecting step of detecting contact between the grinding tooth surface and the tooth surface with a contact detector;
    a rotational speed changing step of changing a rotational speed of either one of the grinding tool and the gear such that the detection result by the contact detector falls within a prescribed range; and
    measuring an amount of phase change of the grinding tool and the gear, which are made in the rotational speed changing step, along an entire circumference of the gear.

5. A grinding tool forming apparatus comprising:
    a dresser gear having dresser tooth surfaces for contacting grinding tooth surfaces of a helical grinding tooth of a grinding tool, the dresser gear being rotatable in synchronism with the grinding tool while the grinding tooth surface and the dresser tooth surfaces are capable of being held in contact with each other;
    a contact detector for detecting contact between the grinding tooth surface and the dresser tooth surface;
    a rotational speed changing device that is adapted to change a rotational speed of either one of the grinding tool and the dresser gear such that the detection result by the contact detector falls within a prescribed range; and
    a recording device that is adapted to record an amount of phase change of the grinding tool and the dresser gear along a prescribed range of the dresser gear;
    wherein the grinding tool and the dresser gear are rotated in synchronism with each other based on information recorded by the recording device.

6. The grinding tool forming apparatus according to claim 5, wherein the rotational speed changing means changes the rotational speed of the dresser gear.

7. The grinding tool forming apparatus according to claim 5, wherein the contact detector comprises an AE sensor.

8. A grinding tool forming method comprising the steps of:
a synchronous rotating step of rotating a grinding tool and a dresser gear in synchronism with each other while grinding tooth surfaces of a helical grinding tooth of the grinding tool and dresser tooth surfaces of the dresser gear are capable of being held in contact with each other;
a detecting step of detecting contact between the grinding tooth surfaces and the dresser tooth surfaces with a contact detector;
a rotational speed changing step of changing a rotational speed of either one of the grinding tool and the dresser gear such that the detection result by the contact detector falls within a prescribed range; and
a recording step of recording an amount of phase change of the grinding tool and the dresser gear along a prescribed range of the dresser gear;
wherein the grinding tool and the dresser gear are rotated in synchronism with each other based on information recorded in the recording step.

9. A gear meshing method for a gear grinding apparatus, comprising the steps of:
a synchronous rotating step of rotating a grinding tool and a workpiece gear in synchronism with each other while a helical grinding tooth of the grinding tool and a tooth of the workpiece gear are capable of being held in contact with each other;
a detecting step of detecting contact between the grinding tooth and the tooth with a contact detector;
a first rotational speed changing step of changing a rotational speed of either one of the grinding tool and the workpiece gear such that the detection result by the contact detector falls within a prescribed range, thereby bringing a right tooth surface of the tooth into contact with the grinding tooth;
a second rotational speed changing step of changing a rotational speed of either one of the grinding tool and the workpiece gear such that the detection result by the contact detector falls within a prescribed range, thereby bringing a left tooth surface of the tooth into contact with the grinding tooth;
a recording step of recording an amount of phase change of the grinding tool and the workpiece gear, which are made in the first and second rotational speed changing steps along the entire circumference of the workpiece gear; and
a calculating step of calculating a central position of the tooth with respect to the grinding tooth when the grinding tooth and the tooth are held in mesh with each other, based on information recorded in the recording step.

10. The gear meshing method according to claim 9, wherein the first rotational speed changing step changes the rotational speed of the workpiece gear, and the second rotational speed changing step changes the rotational speed of the workpiece gear.

* * * * *